United States Patent
Yang et al.

(10) Patent No.: US 9,366,803 B2
(45) Date of Patent: Jun. 14, 2016

(54) DISPLAY DEVICE

(71) Applicant: Samsung Display Co., Ltd., Yongin, Gyeonggi-Do (KR)

(72) Inventors: Jung-Hyun Yang, Hwaseong-si (KR); Young-Min Park, Hwaseong-si (KR); Seokhyun Nam, Seoul (KR); Seki Park, Hwaseong-si (KR); Ho-Sik Shin, Gunpo-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 214 days.

(21) Appl. No.: 14/154,869

(22) Filed: Jan. 14, 2014

(65) Prior Publication Data

US 2015/0009713 A1    Jan. 8, 2015

(30) Foreign Application Priority Data

Jul. 4, 2013  (KR) .......................... 10-2013-0078480

(51) Int. Cl.
*F21V 29/00* (2015.01)
*F21V 8/00* (2006.01)

(52) U.S. Cl.
CPC ............ *G02B 6/0085* (2013.01); *G02B 6/0031* (2013.01); *G02B 6/0083* (2013.01)

(58) Field of Classification Search
CPC ..................................................... G02B 6/0085
USPC .......................... 362/97.3, 612, 613, 294, 373
See application file for complete search history.

(56) References Cited

U.S. PATENT DOCUMENTS

| | | | | |
|---|---|---|---|---|
| 8,192,055 B2 * | 6/2012 | Nittou | ................. | G02B 6/0068 362/231 |
| 8,573,811 B2 * | 11/2013 | Lin | ...................... | G02B 6/0085 362/249.02 |
| 8,727,562 B2 * | 5/2014 | Yu | ........................... | G09F 13/18 362/218 |
| 8,752,995 B2 * | 6/2014 | Park | ..................... | H05K 1/0209 362/294 |
| 8,851,736 B2 * | 10/2014 | Lee | ....................... | H05K 1/0209 362/294 |
| 2010/0085502 A1 | 4/2010 | Yen et al. | | |
| 2013/0010496 A1 | 1/2013 | Higashi et al. | | |
| 2015/0116986 A1 * | 4/2015 | Yu | ........................ | F21V 29/004 362/97.3 |

FOREIGN PATENT DOCUMENTS

| | | |
|---|---|---|
| JP | 2006216244 A | 8/2006 |
| KR | 1020100077872 A | 7/2010 |
| KR | 1020120037101 A | 4/2012 |
| KR | 1020120075014 A | 7/2012 |
| KR | 1020130003935 A | 1/2013 |

* cited by examiner

*Primary Examiner* — Anabel Ton
(74) *Attorney, Agent, or Firm* — Cantor Colburn LLP (57) ABSTRACT

A display device includes: a light guide member under the display panel and including a light incident surface; a heat discharge member including a heat discharge surface which extends in a first direction opposite to the light incident surface of the light guide member, and a first flat surface which extends in a second direction from the heat discharge surface; and a light source on the heat discharge member, which provides light to the light incident surface and includes a light emitting device on the heat discharge surface and including a light emitting surface opposite to the light incident surface, a circuit board on the first flat surface of the heat discharge member and electrically connected to the light emitting device, and a heat discharge portion on the heat discharge member and which couples the light emitting device to the heat discharge surface of the heat discharge member and discharges a heat generated from the light emitting device.

20 Claims, 9 Drawing Sheets

DISPLAY DEVICE

This application claims priority to Korean Patent Application No. 10-2013-00078480, filed on Jul. 4, 2013, and all the benefits accruing therefrom under 35 U.S.C. §119, the content of which in its entirety is herein incorporated by reference.

BACKGROUND

1. Field

Exemplary embodiments of the invention relate to a display device. More particularly, exemplary embodiments of the invention relate to a display device with improved heat-discharge characteristic.

2. Description of the Related Art

In general, a display device is classified into a transmissive type, a transflective type, and a reflective type. The transmissive type and transflective type display devices typically include a display panel to display an image and a backlight unit to supply light to the display panel.

The backlight unit typically includes a light source that emits the light and a light guide member that guides the light from the light source to the display panel. The light source may include a light emitting device and a circuit board electrically connected to the light emitting device. In a conventional transmissive type or transflective type display device, the light emitting device and the circuit board, which are electrically connected to each other, are typically disposed substantially close to each other, such that a heat generated from the light emitting device may be transferred to the circuit board.

SUMMARY

The invention provides a display device with an improved heat-discharge characteristic.

According to an exemplary embodiment of the invention, a display device includes a protective member, a display panel disposed in the protective member, a light guide member disposed under the display panel where the light guide member includes a light incident surface, a heat discharge member including a heat discharge surface disposed opposite to the light incident surface, and a first flat surface which extends from the heat discharge surface, and a light source disposed on the heat discharge member. In such an embodiment, the light source provides light to the light incident surface and includes a light emitting device disposed on the heat discharge surface and including a light emitting surface disposed opposite to the light incident surface, a circuit board disposed on the first flat surface and electrically connected to the light emitting device, and a heat discharge portion disposed on the heat discharge member where the heat discharge portion couples the light emitting device to the heat discharge surface and discharges a heat generated by the light emitting device.

In an exemplary embodiment, the light guide member may further include a first surface from which the light incident to the light guide member through the light incident surface exits to the display panel, a second surface disposed opposite to the first surface, and a plurality of connection surfaces which connects the first surface and the second surface, where the light incident surface defined by one of the connection surfaces.

In an exemplary embodiment, the light incident surface may be disposed at a corner of the light guide member.

In an exemplary embodiment, the light source may further include first and second conductive portions which electrically connect the circuit board to the light emitting device, and the first and second conductive portions are insulated from the heat discharge portion.

In an exemplary embodiment, the heat discharge portion may be spaced apart from the first and second conductive portions.

In an exemplary embodiment, the light emitting device may further include a light emitting diode which defines the light emitting surface, and a body portion including a first surface on which the light emitting diode is disposed, and a second surface attached to the heat discharge surface.

In an exemplary embodiment, the heat discharge portion may be disposed through and within the body portion, and the light emitting diode may be disposed directly on the heat discharge portion.

In an exemplary embodiment, the light emitting device may further include a plurality of light emitting diodes disposed to be spaced apart from each other, and the light emitting diodes are disposed on the heat discharge portion.

In an exemplary embodiment, the heat discharge portion may include a plurality of sub-heat discharge portions insulated from each other and corresponding to the light emitting diodes, respectively, and each of the sub-heat discharge portions may include a first surface on which a corresponding light emitting diode of the light emitting diodes is disposed, and a second surface coupled to the heat discharge surface of the heat discharge member.

In an exemplary embodiment, the heat discharge member may further include a second flat surface which extends from the heat discharge surface is disposed opposite to the first flat surface.

In an exemplary embodiment, the circuit board may be in contact with the first flat surface or the second flat surface.

In an exemplary embodiment, the circuit board may include a reflective layer disposed on a surface thereof which is disposed opposite to the light guide member.

According to another exemplary embodiment of the invention, a display device includes: a protective member; a display panel disposed in the protective member; a light guide member disposed under the display panel and including a first surface, a second surface, and a light incident surface which connected the first and second surfaces; a heat discharge member including a side surface portion including a heat discharge surface disposed opposite to the light incident surface, and a first extension portion which extends from the side surface portion and is disposed on a surface of the light guide member, and a light source including a light emitting device coupled to the side surface portion, and a circuit board disposed on the first extension portion and electrically connected to the light emitting device. In such an embodiment, the light source includes a light emitting diode, a first conductive portion insulated from the side surface portion and electrically connected to the light emitting diode, a second conductive portion insulated from the side surface portion and electrically connected to the light emitting diode, and a heat discharge portion insulated from the first and second conductive portions, where the heat discharge portion includes a first surface on which the light emitting diode is disposed, and a second surface coupled to the side surface portion.

In an exemplary embodiment, the second surface of the heat discharge portion may be in direct contact with the heat discharge surface.

In an exemplary embodiment, the heat discharge portion may be spaced apart from the first and second conductive portions.

In an exemplary embodiment, the heat discharge member may further include a second extension portion which extends from the side surface portion and is disposed opposite to the first extension portion, where the light guide member is disposed between the first extension portion and the second extension portion.

In an exemplary embodiment, the first extension portion may be disposed on the first surface of the light guide member, and the circuit board may be disposed between the first extension portion and the light guide member.

In an exemplary embodiment, the first extension portion may be disposed on the second surface of the light guide member, and the circuit board may be disposed between the first extension portion and the light guide member.

According to another exemplary embodiment of the invention, a display device includes: a protective member; a display panel disposed in the protective member; a light guide member disposed under the display panel and including a light incident surface; a heat discharge member including a side surface portion including a heat discharge surface disposed opposite to the light incident surface, a first extension portion which extends from the side surface portion to a lower side of the light guide member, and a second extension portion which extends from the side surface portion to an upper side of the light guide member; and a light source including a light emitting device coupled to the side surface portion, and a circuit board disposed on the first extension portion and electrically connected to the light emitting device. In such an embodiment, the light emitting device includes a first light emitting diode, a second light emitting diode, a third light emitting diode disposed between the first light emitting diode and the second light emitting diode, a first conductive portion insulated from the side surface portion and electrically connected to the first light emitting diode, a second conductive portion insulated from the side surface portion and electrically connected to the second light emitting diode, a first heat discharge portion that includes a first surface on which the first light emitting diode is disposed and a second surface coupled to the side surface portion, a second heat discharge portion including a first surface on which the second light emitting diode is disposed and a second surface coupled to the side surface portion, and a third heat discharge portion including a first surface on which the third light emitting diode is disposed and a second surface coupled to the side surface portion, where the first, second, and third heat discharge portions are insulated from each other and insulated from the first and second conductive portions.

According to exemplary embodiments described herein, the heat generated by the light emitting diode is discharged to the support member through the conductive member without passing through the circuit board, such that the display device may have improved heat-discharge characteristic, and thus reliability of the display device may be improved.

BRIEF DESCRIPTION OF THE DRAWINGS

The above and other features of the invention will become readily apparent by reference to the following detailed description when considered in conjunction with the accompanying drawings, in which.

DETAILED DESCRIPTION

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be explained in detail with reference to the accompanying drawings.

Figure 1:
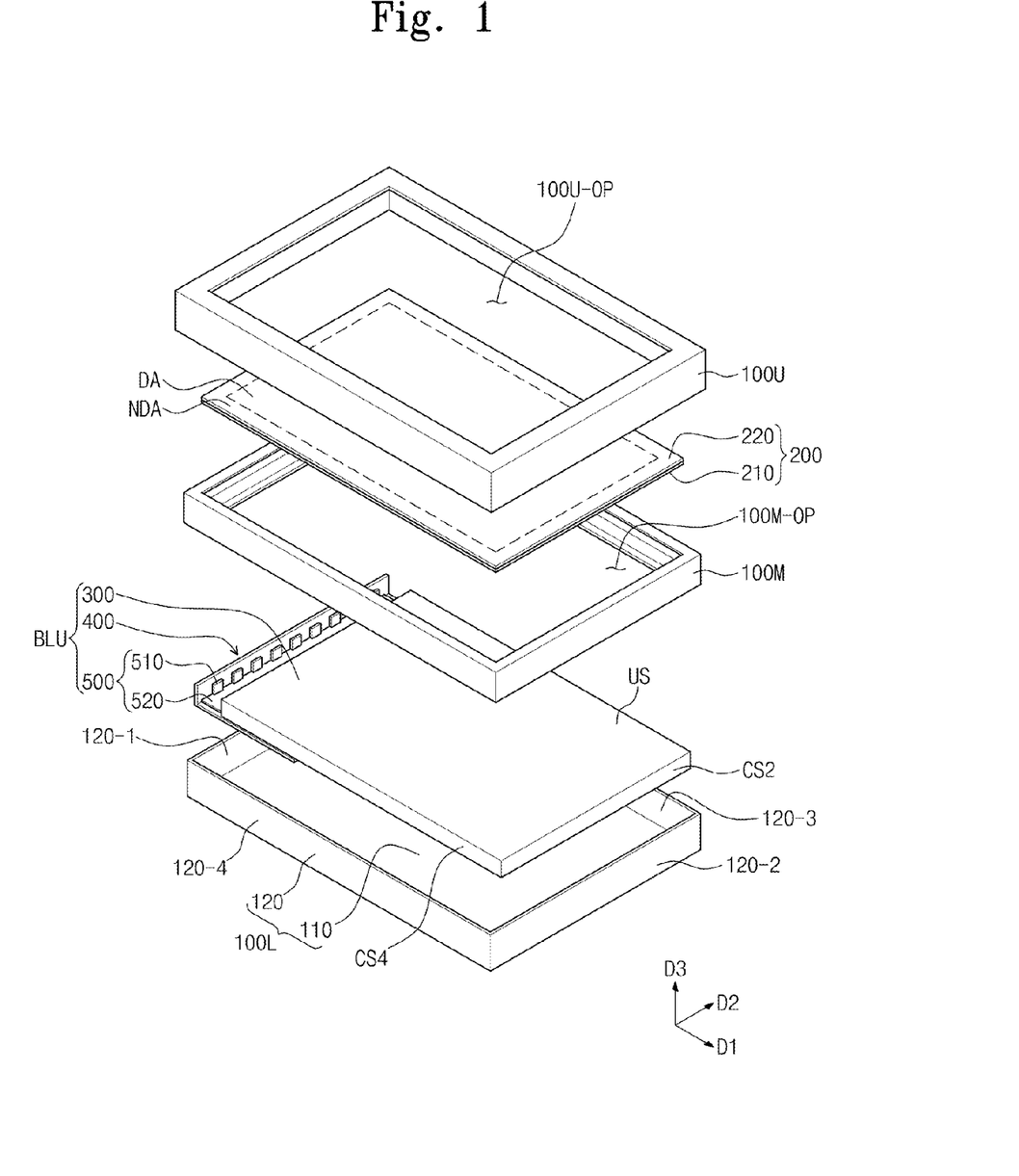
FIG. 1 is an exploded perspective view of an exemplary embodiment of a display device according to the invention.

FIG. 1 is an exploded perspective view of an exemplary embodiment of a display device according to the invention.

Referring to FIG. 1, a display device includes protective members 100U, 100M and 100L, a display panel 200 and a backlight unit BLU.

In such an embodiment, the protective members 100U, 100M and 100L include an upper protective member 100U, a lower protective member 100L, and an intermediate protective member 100M disposed between the upper protective member 100U and the lower protective member 100L, which are coupled to each other. The upper protective member 100U and the lower protective member 100L accommodate different elements of the display device and protect the elements accommodated therein.

The upper protective member 100U is disposed on the display panel 200. An opening 100U-OP is defined in the upper protective member 100U. The opening 100U-OP exposes a portion of the display panel 200, e.g., a display area DA in which an image is displayed.

The upper protective member 100U overlaps, e.g., covers, a non-exposed portion of the display panel 200, e.g., a non-display area NDA. The non-display area NDA is disposed adjacent to the display area DA and the image is not displayed thereon.

The lower protective member 100L accommodates the backlight unit BLU. The lower protective member 100L includes a bottom portion 110 and a sidewall portion 120 which extends upward from the bottom portion 110.

The bottom portion 110 may have a rectangular shape when viewed in a plan view. The sidewall portion 120 extends upward from four sides of the bottom portion 110. The sidewall portion 120 may be divided into four portions corresponding to the four sides of the bottom portion 120, respectively.

The four portions of the sidewall portion 120 include first sidewalls 120-1 and 120-1 disposed opposite to, e.g., facing, each other in a first direction D1, and second sidewalls 120-3 and 120-4 disposed opposite to, e.g., facing, each other in the second direction D2. The four portions of the sidewall portion 120 may surround the bottom portion 110.

The intermediate protective member 100M is disposed between the upper protective member 100U and the lower protective member 100L. The intermediate protective member 100M has a rectangular frame shape and overlaps the non-display area NDA of the display panel 200. An opening 100M-OP may be defined in the intermediate protective member 100M, and the intermediate protective member 100M supports the display panel 200.

The display panel 200 receives light from the backlight unit BLU and displays the image using the light. In an exemplary embodiment, the display panel 200 may be a transmissive type display panel or a transflective type display panel, e.g., a liquid crystal display panel, an electrophoretic display panel, or an electrowetting display panel.

In an exemplary embodiment, where the display panel 200 is a liquid crystal display panel, the display panel 200 includes a first substrate 210, a second substrate 220 and a liquid crystal layer (not shown) interposed between the first substrate 210 and the second substrate 220.

The backlight unit BLU is accommodated in the lower protective member 100L. The backlight unit BLU is disposed under the display panel 200 to provide the light to substantially an entire of a surface (e.g., a lower surface) of the display panel 200.

Hereinafter, an exemplary embodiment of the backlight unit BLU will be described in detail with reference to FIG. 2.

Figure 2:
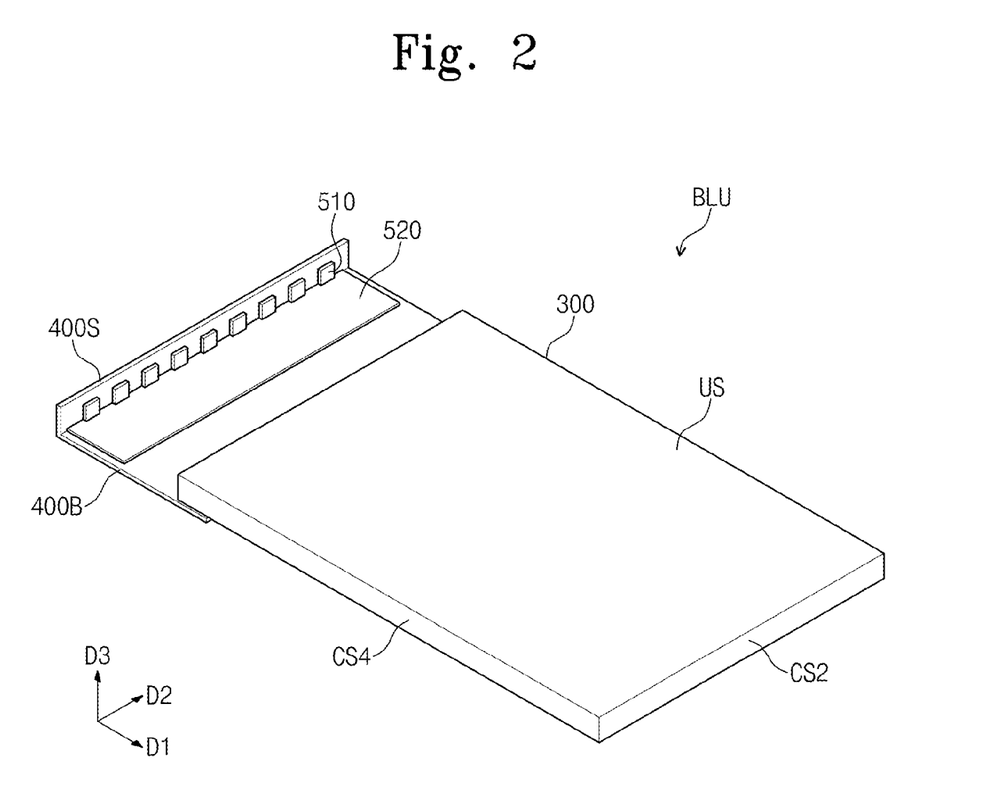
FIG. 2 is an exploded perspective view of an exemplary embodiment of a backlight unit shown in FIG. 1.

FIG. 2 is an exploded perspective view of the backlight unit shown in FIG. 1.

Referring to FIG. 2, the backlight unit BLU includes a light guide member 300, a support member 400 that supports the light guide member 300, and a light source 500 that emits light.

The light source 500 includes a light emitting device 510 and a circuit board 520 electrically connected to the light emitting device. In an exemplary embodiment, as show in FIG. 2, the light source 500 includes a plurality of light emitting device 510.

Referring back to FIG. 1, the light guide member 300 is disposed under the display panel 200. The light guide member 300 guides the light provided from the light source 500 to the display panel 200.

The light guide member 300 includes a first surface US, a second surface (not shown), and a plurality of connection surfaces that connects the first surface US and the second surface. The light guide member 300 includes a light incident surface.

In an exemplary embodiment, as shown in FIG. 2, the light guide member 300 may have a rectangular plate shape. In such an embodiment, the connection surfaces include two connection surfaces disposed opposite to each other in the first direction D1, and two connection surfaces disposed opposite to each other in the second direction D2 substantially perpendicular to the first direction D1. FIGS. 1 and 2 show only two connection surfaces CS2 and CS4 of the four connection surfaces.

One of the two connection surfaces disposed opposite to each other in the first direction D1 faces the light emitting devices 510. A connection surface disposed facing the light emitting devices 510 is referred to as the light incident surface. A connection surface disposed opposite to the light incident surface is referred to as an opposing surface CS2.

In an exemplary embodiment, the two connection surfaces disposed opposite to each other in the second direction D2 are referred to as a first connection surface (not shown) and a second connection surface CS4, respectively. The first connection surface and the second connection surface CS4 connect the light incident surface and the opposing surface CS2. The light incident surface and the opposing surface CS2 extend in the second direction D2, and the first connection surface and the second connection surface CS4 extend in the first direction D1.

The light incident into the light guide member 300 through the light incident surface exits through the first surface US. The second surface (not shown) of the light guide member 300 faces the first surface US in a thickness direction of the light guide member 300.

The light guide member 300 defines the backlight unit BLU together with the support member 400 that support the light guide member 300 and the light source 500 coupled to the support member 400.

As show in FIGS. 1 and 2, the support member 400 is coupled to the light source 500, and the support member 400 supports the light guide member 300. The support member 400 includes a sidewall portion 400S and a first extension portion 400B connected to the sidewall portion 400S.

The sidewall portion 400S protrudes in a third direction D3 substantially perpendicular to the first and second directions D1 and D2. The sidewall portion 400S includes a heat discharge surface 400S-S (shown in FIG. 4) disposed opposite to the light incident surface CS1.

The first extension portion 400B extends from an edge portion of the sidewall portion 400S in the first direction D1. The first extension portion 400B supports the light guide member 300. The first extension portion 400B includes an inner surface 400B-S (shown in FIG. 4).

The support member 400 may include a metal material having high heat conductivity. In one exemplary embodiment, for example, the support member 400 includes copper or aluminum. The support member 400 discharges heat generated from the light source 500 to the outside of the backlight unit BLU. In an exemplary embodiment, the support member 400 may have a bar-like shape, e.g., a shape of an extruded bar.

The light source 500 is disposed between the support member 400 and the light guide member 300. The light source 500 includes the light emitting devices 510 and the circuit board 520 disposed adjacent to a side surface of the light emitting devices 510.

The light emitting devices 510 are electrically connected to the circuit board 520. In an exemplary embodiment, the light source 500 may include a plurality of circuit boards 520 corresponding to the light emitting devices 510, respectively.

In an exemplary embodiment, the light emitting device 510 may be disposed on a surface different from a surface on which the circuit board 520 is disposed. In such an embodiment, as shown in FIG. 2, the light emitting devices 510 may be coupled to the heat discharge surface 400S-S of the sidewall portion 400S, and the circuit board 520 is disposed on the inner surface 400B-S of the first extension portion 400B.

Hereinafter, an exemplary embodiment of the light emitting devices 510 will be described in greater detail with reference to FIG. 3.

Figure 3:
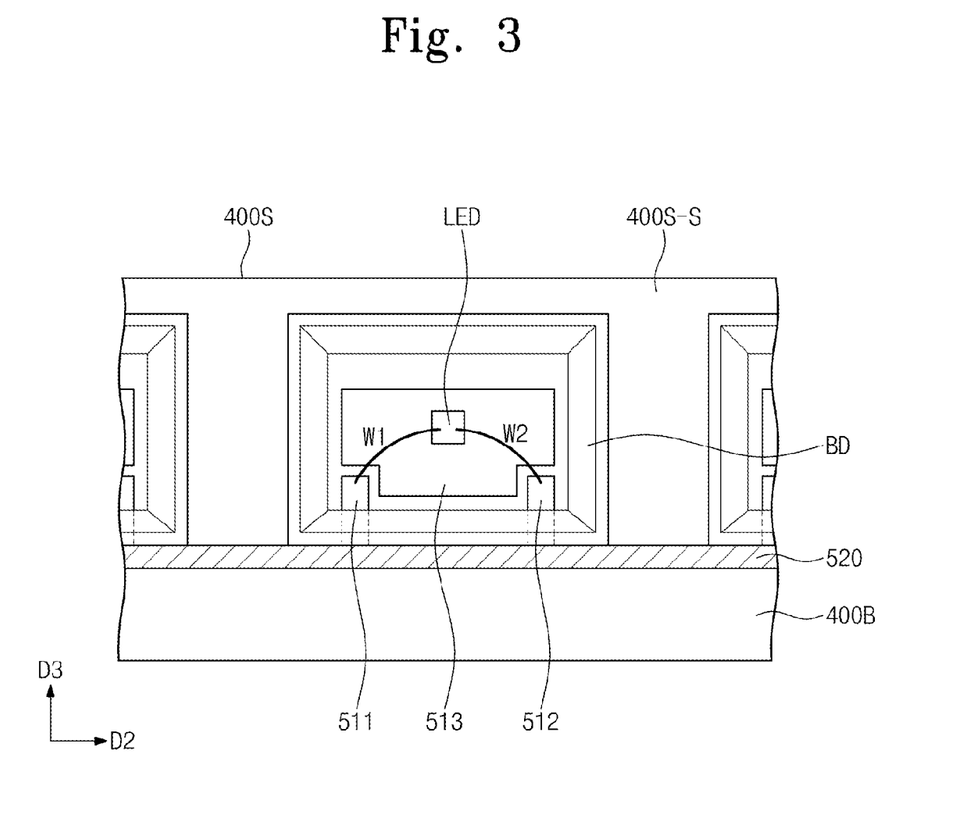
FIG. 3 is a front view of a portion of the backlight unit shown in FIG. 2.
Figure 4:
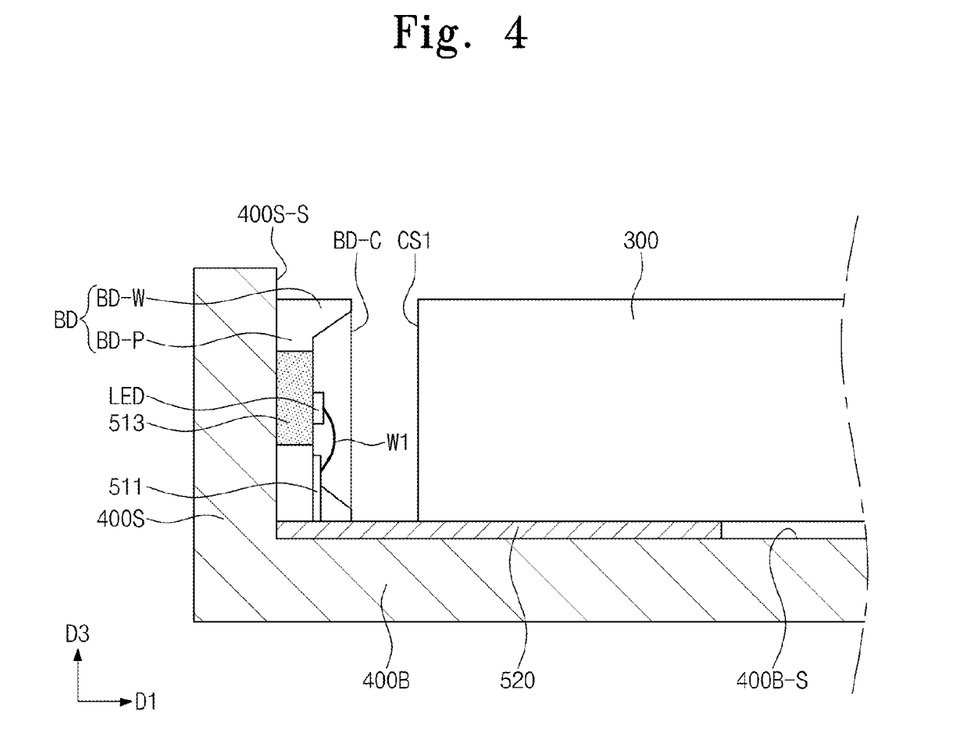
FIG. 4 is a cross-sectional view of a portion of an exemplary embodiment of a backlight unit according to the invention.

FIG. 3 is a front view of an exemplary embodiment of the light source 500 coupled to the support member 400, and FIG. 4 is a cross-sectional view of a portion of the backlight unit BLU.

Referring to FIGS. 3 and 4, each of the light emitting devices 510 includes a light emitting diode LED and a body portion BD. The body portion BD includes a first conductive portion 511, a second conductive portion 512 and a heat discharge portion 513.

In an exemplary embodiment, the light emitting diode LED includes first and second electrodes (not shown). In such an embodiment, the light emitting diode LED emits the light in response to a driving voltage applied thereto by the first and second electrodes.

In an exemplary embodiment, the light emitting diode LED is disposed between the first and second electrodes and may have a structure in which an n-type semiconductor layer, an active layer, and a p-type semiconductor layer are sequentially stacked on one another. In such an embodiment, when the driving voltage is applied to the light emitting diode LED, holes and electrons are recombined with each other while moving in opposite directions, and thus the light is generated.

FIG. 3 shows a light emitting surface of the light emitting device. The light generated by the light emitting diode LED exits through the light emitting surface. The light emitting surface is defined by the light emitting diode and a portion of the body portion BD. The light emitting device 510 is disposed to allow the light emitting surface to face the light incident surface of the light guide member 300.

The body portion BD includes a bottom portion BD-P and a barrier wall BD-W obliquely protruding from the bottom portion BD-P. The bottom surface BD-P is coupled to the heat discharge surface 400S-S to fix the heat discharge portion 513 to the first surface. The barrier wall BD-W defines an outer shape of the body portion BD and protects the light emitting diode LED.

The body portion BD may maintain the first conductive portion 511, the second conductive portion 512 and the heat discharge portion 513 in predetermined position in the support member 400. The body portion BD insulates the heat discharge portion 513 from the first conductive portion 511 and the second conductive portion 512.

In an exemplary embodiment, as shown in FIGS. 3 and 4, the first and second conductive portions 511 and 512 may be disposed on one surface of the body portion BD. The first and second conductive portions 511 and 512 are disposed to be spaced apart from each other.

The first and second conductive portions 511 and 512 are connected to the light emitting diode LED. The first conductive portion 511 is connected to one of the first and second electrodes of the light emitting diode LED, and the second conductive portion 512 is connected to the other of the first and second electrodes of the light emitting diode LED.

The first and second conductive portions 511 and 512 are connected to the circuit board 520. Electrical signals from the circuit board 520 are applied to the light emitting diode LED through the first and second conductive portions 511 and 512. In an exemplary embodiment, the light emitting diode LED may receive the driving voltage from the first and second conductive portions 511 and 512 through first and second wirings W1 and W2.

In an exemplary embodiment, as shown in FIG. 4, the light emitting diode LED is disposed on a surface of the heat discharge portion 513. The heat discharge portion 513 is disposed through and within the body portion BD such that the heat discharge portion 513 is coupled to (e.g., in thermal communication with) the heat discharge surface 400S-S through the body portion BD. In an exemplary embodiment, an insulating layer (not shown) may be disposed between the heat discharge portion 513 and the heat discharge surface 400S-S, which are coupled to each other.

In an exemplary embodiment, as shown in FIG. 4, the body portion BD includes a bottom portion, e.g., a flat bottom portion, BD-P and the barrier wall BD-W. The bottom portion BD-P of the body portion BD includes a bottom surface disposed opposite to the heat discharge surface 400S-S of the support member 400, an upper side surface opposite to the bottom surface. The barrier wall BD-W includes an outer side which extends from the bottom surface, and an inner side which obliquely extends from the outer side toward the upper side surface of the bottom portion BD-P. In such an embodiment, the barrier wall BD-W surrounds the upper side surface of the bottom portion BD-P.

The bottom surface of the bottom portion BD-P has an area larger than an area of the upper side surface of the bottom portion BD-P, and the outer side surface of the barrier wall BD-W has a length greater than a distance between the upper side surface and the bottom surface of the bottom portion BD-P.

In an exemplary embodiment, the body portion BD may include a reflective metal layer disposed, e.g., coated, on the inner side surface of the barrier wall BD-W such that light incident onto the inner side surface of the barrier wall BD-W is reflected. The reflective metal layer may include a metal material, e.g., silver, gold, or copper. The barrier wall BD-W including the reflective metal layer may define a reflective cup.

In such an embodiment, the barrier wall BD-W allow the light emitted from the light emitting diode LED to travel toward the light incident surface of the light guide member 300, e.g., to the first direction D1. The barrier wall BD-W effectively prevents the light from leaking around the light emitting device 510.

In an exemplary embodiment, as shown in FIG. 4, the light emitting device 510 further includes a cover portion BD-C that covers the light emitting diode LED disposed on the barrier wall BD-W. In such an embodiment, the cover portion BD-C is disposed on the barrier wall BD-W, and covers the upper side surface of the of the bottom portion BD-P. In such an embodiment, the cover portion BD-C protects the light emitting diode LED.

The cover portion BD-C includes a transparent material, e.g., glass, plastic, etc., with high transmittance to reduce loss in light emitted from the light emitting diode LED. In an exemplary embodiment, a molding agent may be disposed in an inner space defined by the barrier wall BD-W and the cover portion BD-C such that the light emitting diode LED is effectively protected.

In an exemplary embodiment, as shown in FIG. 3, the heat discharge portion 513 is insulated from the first and the second conductive portions 511 and 512. In such an embodiment, the heat discharge portion 513 is disposed to be spaced apart from the first and second conductive portions 511 and 512. The heat discharge portion 513 is spaced apart from does not overlap the first and second conductive portions 511 and 512 such that the heat discharge portion 513 is spaced apart from the first and second conductive portions 511 and 512.

In an alternative exemplary embodiment, each of the first and second conductive portions 511 and 512 may be disposed through and within a portion of the body portion BD. In such an embodiment, one end portion (e.g., a first end portion) of each of the first and second conductive portions 511 and 512 is exposed to the upper side surface and the other end portion (e.g., a second end portion) of each of the first and second conductive portions 511 and 512 is connected to the circuit board 520 through the body portion BD. In such an embodiment, the other end portion which extends from the one end portion may be protruded from the body portion BD.

In such an embodiment, the one end portion of the first conductive portion 511 may be connected to the light emitting diode LED through the first wiring W1, and the one end portion of the second conductive portion 512 may be connected to the light emitting diode LED through the second wiring W2.

In an exemplary embodiment, the driving voltage is applied to the light emitting diode LED through the first and second conductive portions 511 and 512, and the heat generated by the light emitting diode LED is discharged to the support member 400 through the heat discharge portion 513. In such an embodiment, the heat generated by the light emitting device 510 is substantially directly discharged to the support member 400 without passing through the circuit board 520, such that the heat discharge property of the backlight unit BLU is substantially improved.

Each of the first conductive portion 511, the second conductive portion 512 and the heat discharge portion 513 may include a metal material with the high conductivity. In such an embodiment, the heat discharge portion 513 may include a material having a relatively higher heat discharge property than a material of the first and second conductive portions 511 and 512. In one exemplary embodiment, for example, the first and second conductive portions 511 and 512 include and the heat discharge portion 513 includes aluminum, but the invention is not be limited thereto or thereby.

Figure 5A:
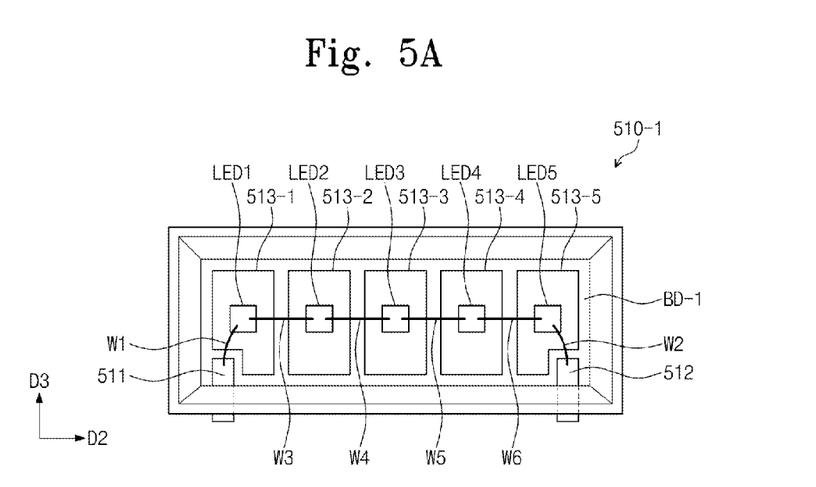
FIG. 5A is a front view of an exemplary embodiment of a light emitting device according to the invention.
Figure 5B:
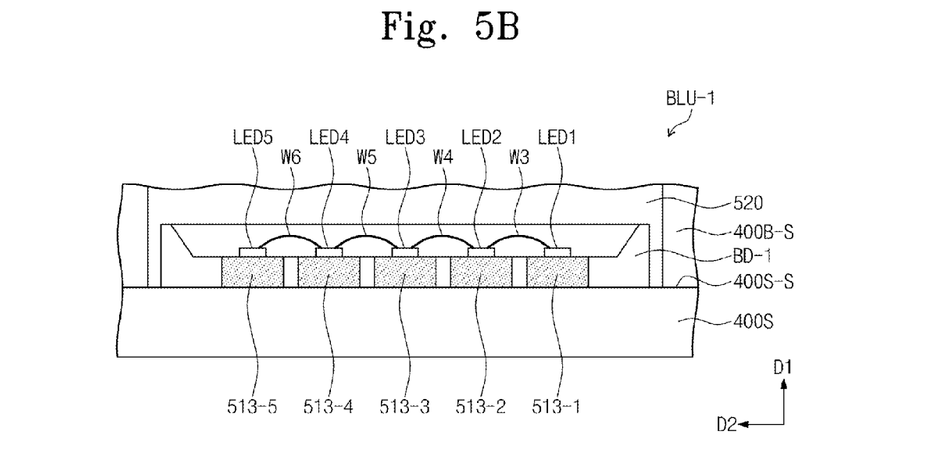
FIG. 5B is a cross-sectional view of a portion of the backlight unit including the light emitting device shown in FIG. 5A.

FIG. 5A is a front view of an exemplary embodiment of a light emitting device according to the invention, and FIG. 5B is a plan view of a portion of the backlight unit including the light emitting device shown in FIG. 5A.

The light emitting device in FIGS. 5A and 5B is substantially the same as the light emitting device shown in FIGS. 3 and 4 except for the light emitting diode and the heat discharge portion. The same or like elements shown in FIGS. 5A and 5B have been labeled with the same reference characters as used above to describe the exemplary embodiments of the light emitting device shown in FIGS. 3 and 4, and any repetitive detailed description thereof will hereinafter be omitted or simplified.

Referring to FIGS. 5A and 5B, an exemplary embodiment of the backlight unit BLU-1 includes a light emitting device 510-1 including light emitting diodes LED1, LED2, LED3, LED4 and LED5 and sub-heat discharge portions 513-1, 513-2, 513-3, 513-4 and 513-5, on which the light emitting diodes LED1, LED2, LED3, LED4 and LED5 are respectively disposed, e.g., mounted.

In such an embodiment, thru-holes are defined through a body portion BD-1, and the sub-heat discharge portions 513-1, 513-2, 513-3, 513-4 and 513-5 are respectively disposed through and within the thru-holes.

Each of the sub-heat discharge portions 513-1, 513-2, 513-3, 513-4 and 513-5 extends through the body portion BD-1. Each of the sub-heat discharge portions 513-1, 513-2, 513-3, 513-4 and 513-5 includes one surface (e.g., a first surface) on which a corresponding light emitting diode of the light emitting diodes LED1, LED2, LED3, LED4 and LED5 is disposed, e.g., mounted, and the other surface (e.g., a second surface) coupled to the heat discharge surface 400S-S. In such an embodiment, the one surface of the other surface of each of the sub-heat discharge portions 513-1, 513-2, 513-3, 513-4 and 513-5 are opposite to each other.

The sub-heat discharge portions 513-1, 513-2, 513-3, 513-4 and 513-5 are disposed between the first conductive portion 511 and the second conductive portion 512. In an exemplary embodiment, the sub-heat discharge portions 513-1, 513-2, 513-3, 513-4 and 513-5 do not overlap the first and second conductive portions 511 and 512 such that the sub-heat discharge portions 513-1, 513-2, 513-3, 513-4 and 513-5 are spaced apart from the first and second conductive portions 511 and 512.

In an exemplary embodiment, as shown in FIGS. 5A and 5B, the light emitting diodes LED1, LED2, LED3, LED4 and LED5 are disposed on the sub-heat discharge portions 513-1, 513-2, 513-3, 513-4 and 513-5, respectively. In such an embodiment, the sub-heat discharge portions 513-1, 513-2, 513-3, 513-4 and 513-5 are disposed on the heat discharge portion 513 (shown in FIG. 3). In such an embodiment, the light emitting diodes LED1, LED2, LED3, LED4 and LED5 are spaced apart from each other.

The light emitting diodes LED1, LED2, LED3, LED4 and LED5 are disposed between the first conductive portion 511 and the second conductive portion 512 to be spaced apart from each other. The light emitting diodes LED1, LED2, LED3, LED4 and LED5 are electrically connected to each other.

Each of the light emitting diodes LED1, LED2, LED3, LED4 and LED5 is connected to adjacent light emitting diodes thereto through wirings W3, W4, W5 and W6. The light emitting diodes LED1 and LED5 respectively adjacent to the first conductive portion 511 and the second conductive portion 512 are respectively connected to the first and second conductive portions 511 and 512 through the wirings W1 and W2.

Figure 6A:
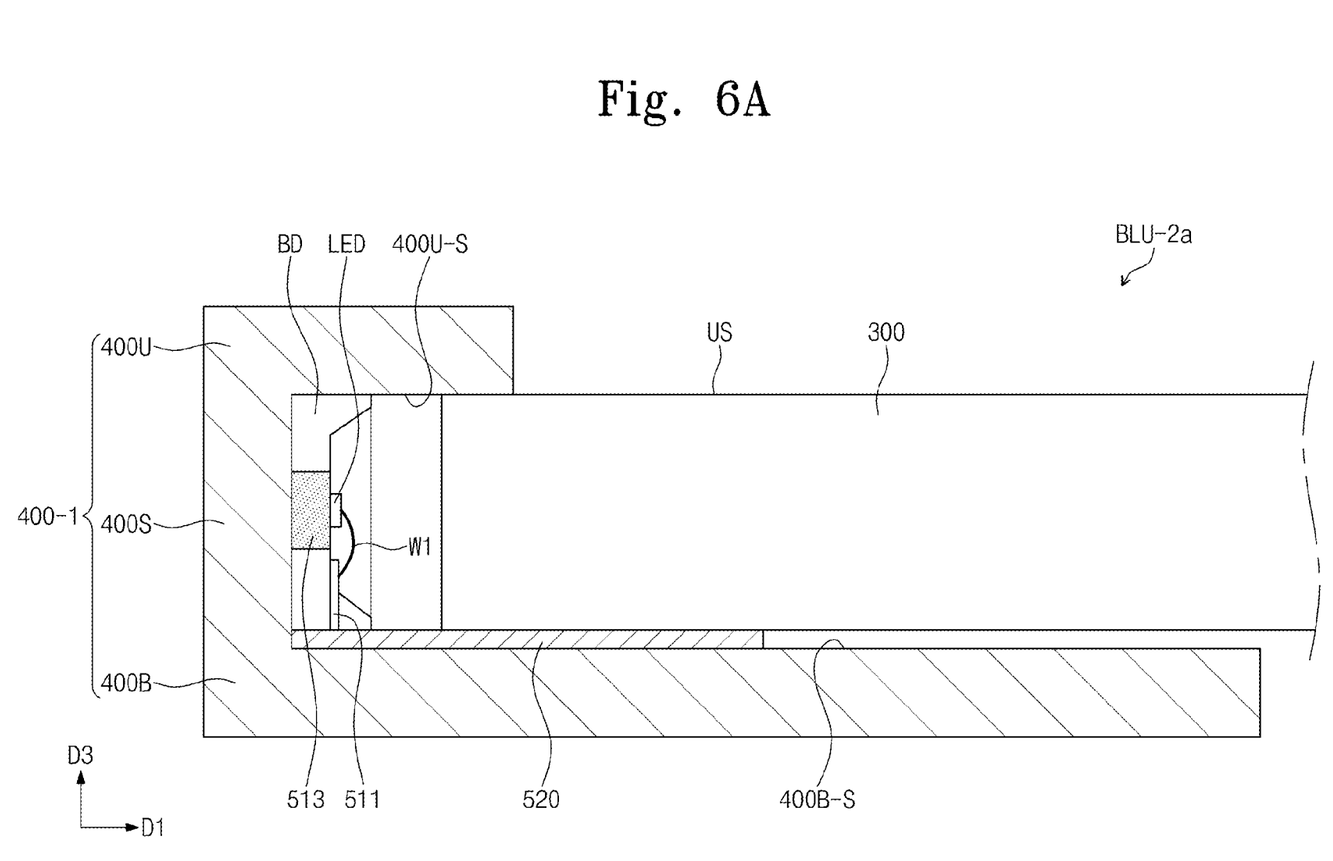
FIGS. 6A and 6B are cross-sectional views of exemplary embodiments of a backlight unit according to the invention.
Figure 6B:
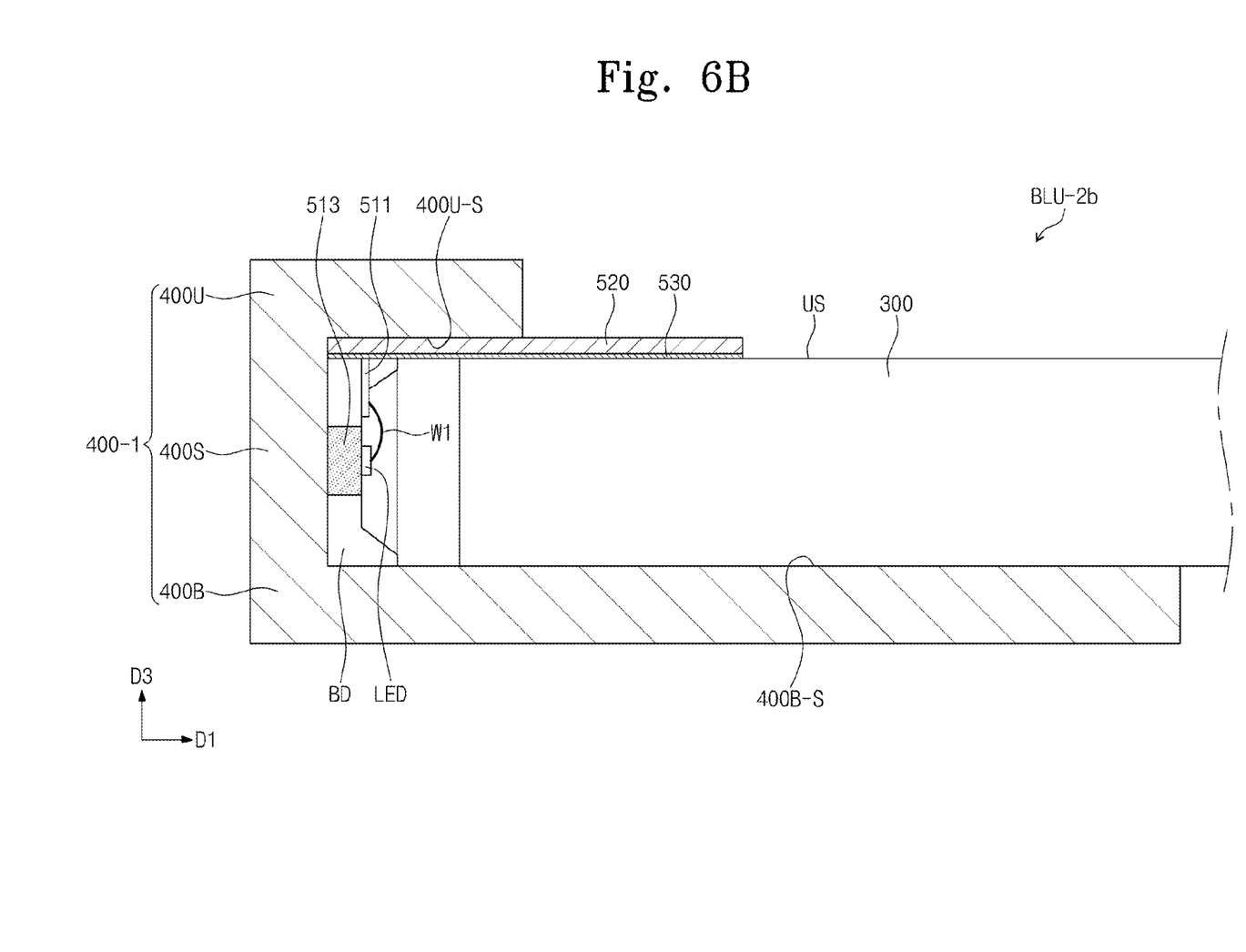

FIGS. 6A and 6B are cross-sectional views of exemplary embodiments of the backlight unit according to the invention. As shown in FIGS. 6A and 6B, an exemplary embodiment of the backlight unit BLU-2a or BLU-2b includes a light guide member 300, a light source 500 to provide the light to the light guide member 300, and a support member 400-1 coupled to the light source 500. The backlight unit in FIG. 6A or 6B is substantially the same as the backlight unit shown in FIGS. 3 and 4 except for the support member and the circuit board. The same or like elements shown in FIGS. 6A and 6B have been labeled with the same reference characters as used above to describe the exemplary embodiment of the backlight unit shown in FIGS. 3 and 4, and any repetitive detailed description thereof will hereinafter be omitted or simplified.

Referring to FIGS. 6A and 6B, the support member 400-1 further includes a second extension portion 400U which extends from the sidewall portion 400S. The second extension portion 400U covers a portion of the first surface US of the light guide member 300.

The second extension portion 400U includes an inner surface 400U-S disposed opposite to the first surface US of the light guide member 300. The inner surface 400B-S of the first extension portion 400B faces the inner surface 400U-S of the second extension portion 400U.

In an exemplary embodiment, as shown in FIG. 6A, the circuit board 520 is disposed on the inner surface 400B-S of the first extension portion 400B. In such an embodiment, the circuit board 520 is disposed between the light guide member 300 and the first extension portion 400B.

In an alternative exemplary embodiment, as shown in FIG. 6B, the circuit board 520 is disposed on the inner surface 400U-S of the second extension portion 400U. In such an embodiment, a portion of the circuit board 520 may extend at the second extension portion 400U over the first surface US of the light guide member 300. The circuit board 520 is disposed between the second extension portion 400U and the first surface US of the light guide member 300. In such an embodiment, the circuit board 520 covers a portion of the light guide member 300.

In an exemplary embodiment, as shown in FIG. 6B, the circuit board 520 may further include a reflective layer 530 disposed thereon to face the light guide member 300. The reflective layer 530 may include a material with high reflectance. In one exemplary embodiment, for example, the reflective layer 530 may include a white polysulfide rubber ("PSR").

In such an embodiment, the reflective layer 530 blocks the light from leaking between the light guide member 300 and the circuit substrate 520. Accordingly, in such an embodiment, the backlight unit BLU effectively prevents the light leakage, and thus light efficiency of the backlight unit BLU is substantially improved.

Figure 7:
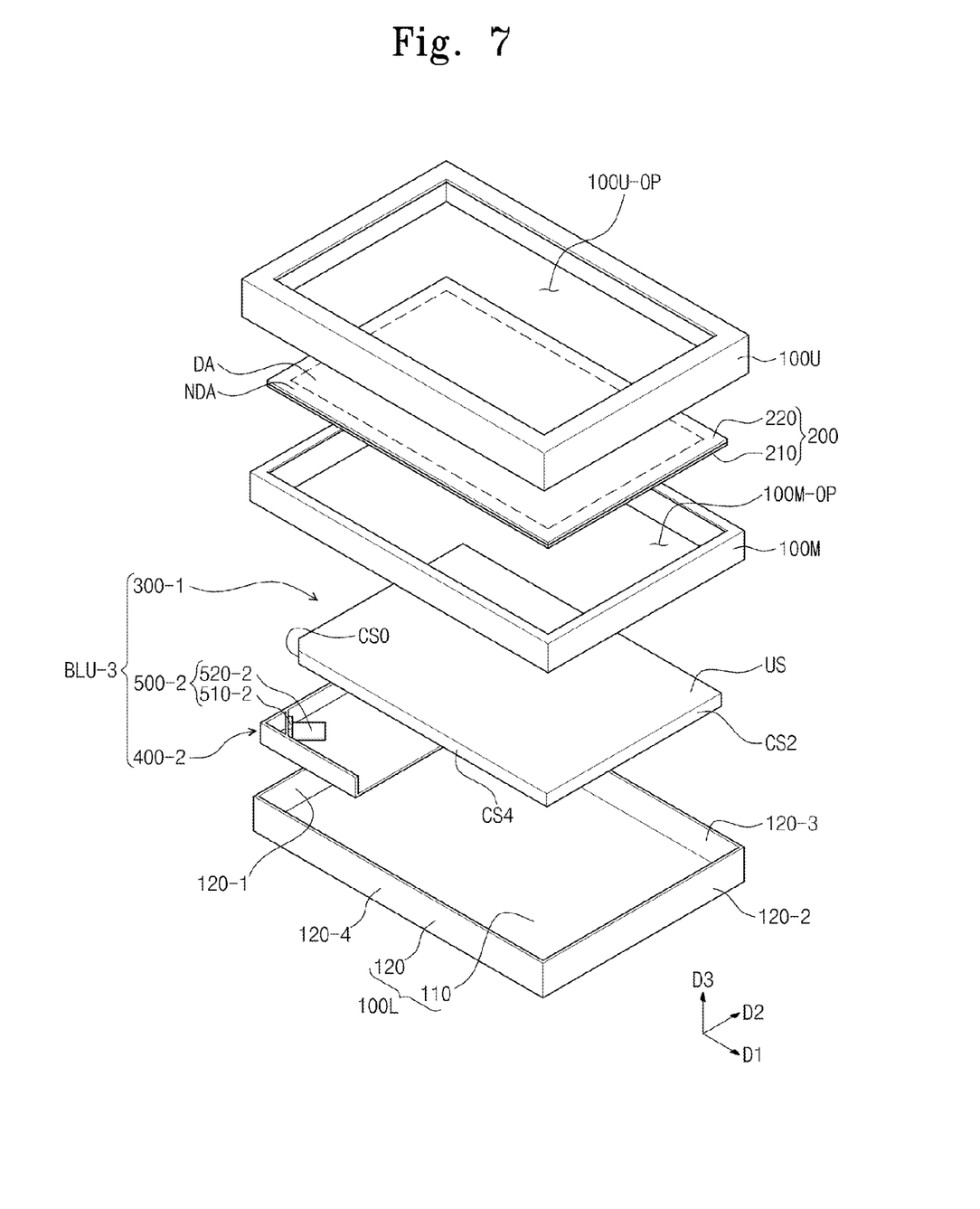
FIG. 7 is an exploded perspective view of an alternative exemplary embodiment of a display device according to the invention.
Figure 8:
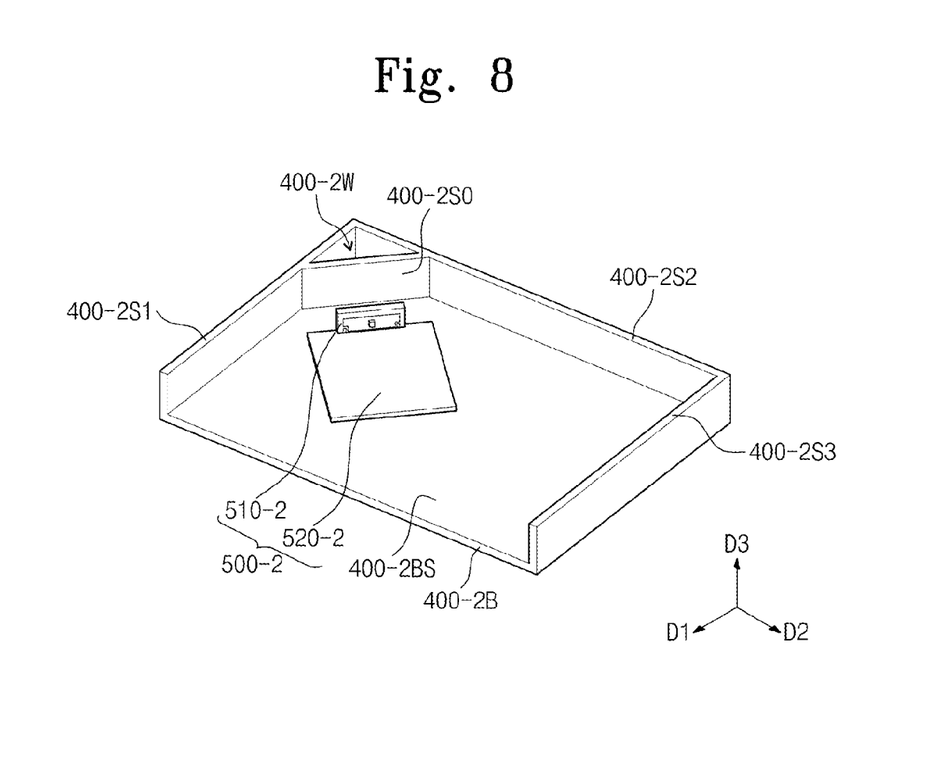
FIG. 8 is a perspective view of a portion of the display device shown in FIG. 7.
Figure 9:
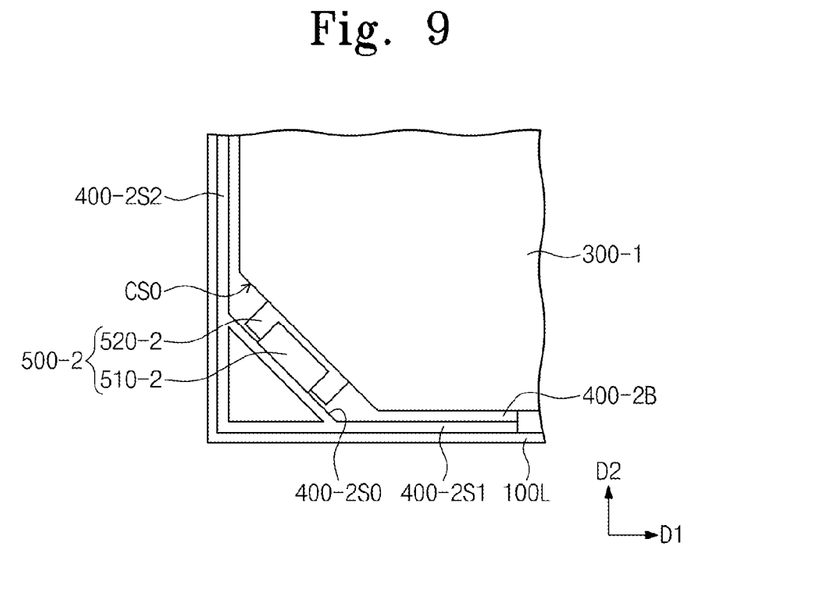
FIG. 9 is a plan view of a portion of the display device shown in FIG. 7.

FIG. 7 is an exploded perspective view of an alternative exemplary embodiment of a display device according to the invention, FIG. 8 is a perspective view of a portion of the display device shown in FIG. 7, and FIG. 9 is a plan view of a portion of the display device shown in FIG. 7.

The display device in FIGS. 7 to 9 is substantially the same as the display device shown in FIGS. 1 to 6 except for the backlight unit. The same or like elements shown in FIGS. 7 to 9 have been labeled with the same reference characters as used above to describe the exemplary embodiments of the display device shown in FIGS. 1 to 6, and any repetitive detailed description thereof will hereinafter be omitted or simplified.

Referring to FIG. 7, an exemplary embodiment of the display device includes a backlight unit BLU-3. The backlight unit BLU-3 includes a light guide member 300-1, a support member 400-2 and a light source 500-2. The support member 400-2 will be described later in greater detail with reference to FIG. 9.

The light guide member 300-1 is disposed under the display panel 200. The light guide member 300-1 includes a first surface US from which the light exits toward the display panel 200, a second surface (not shown) disposed opposite to the first surface US, and a plurality of connection surfaces that connects the first surface US and the second surface.

The connection surfaces include two first connection surfaces disposed opposite to each other in the first direction D1, two second connection surfaces disposed opposite to each other in the second direction D2, and a third connection surface that connects one of the two first connection surfaces and one of the two second connection surfaces.

The first direction D1 is substantially perpendicular to the second direction D2. FIG. 7 shows one first connection surface CS2, one second connection surface CS4, and the third connection surface CS0 that connects the other first connection surface (not shown), which faces the one first connection surface CS2, and the one second side surface CS4.

The third connection surface CS0 faces the light source 500-2. The third connection surface CS0 disposed opposite to the light source 500-1 will be referred to as a light incident surface of the light guide member 300-1. In an exemplary embodiment, as shown in FIG. 7, the light incident surface CS0 is disposed at an edge of the light guide member 300-1, but the invention is not be limited thereto or thereby. In an alternative exemplary embodiment, the light incident surface may be disposed between the other connection surfaces corresponding to a position of the light source 500-2 in the backlight unit BLU-3.

In an exemplary embodiment, as shown in FIGS. 7 and 8, the support member 400-2 is coupled to the lower protective member 100L, and supports a portion of the light guide member 300-1. In such an embodiment, the support member 400-2 includes a first surface 420-2S0 coupled to the light source 500-2.

In an exemplary embodiment, as shown in FIG. 8, the support member 400-2 includes a bottom portion 400-2B and a sidewall portion 400-2S that extends upward from the bottom portion 400-2B. The bottom portion 400-2B includes an inner surface 400-2BS disposed opposite to the light guide member 300-1. The inner surface 400-2BS of the bottom portion 400-2B overlaps a portion of the light guide member 300-1.

Referring to FIG. 9, the sidewall portion 400-2S of the support member 400-2 includes a first sidewall portion 400-2S1 which extends in the first direction D1 and a second sidewall portion 400-2S2 connected to the first sidewall portion 400-2S1 and which extends in the second direction D2.

In such an embodiment, the sidewall portion 400-2S further includes a third sidewall portion 400-2S3 disposed opposite to the first sidewall portion 400-2S1 and connected to the second sidewall 400-2S2.

The sidewall portion 400-2S2 includes the first surface 400-2S0 that connects an inner portion of the first sidewall portion 400-2S1 and an inner portion of the second sidewall portion 400-2S2. The first surface 400-2S0 faces the light incident surface CS0 of the light guide member 300-1. In one exemplary embodiment, for example, a space 400-2W defined by the first surface 400-2S0, a portion of the first sidewall portion 400-2S1, and a portion of the second sidewall portion 400-2S2 may be filled with silicon.

In an exemplary embodiment, as shown in FIG. 9, the light source 500-2 includes a light emitting device 510-2 and a circuit board 520-2 connected to the light emitting device 510-2. In such an embodiment, the light emitting device 510-2 includes a light emitting diode, first and second conductive portions that electrically connect the light emitting diode and the circuit board 520-2, and a heat discharge portion on which the light emitting diode is disposed. The light source 500-2 may be substantially the same as the light source of an exemplary embodiment of a backlight unit described above with reference to FIGS. 1 to 7, and thus any repetitive detailed description of the light source 500-2 will be omitted.

In an exemplary embodiment, as shown in FIG. 9, the light emitting device 510-2 is coupled to the first surface 400-2S0, and the circuit board 520-2 is disposed on the inner surface 400-2BS of the bottom portion 400-2B. Accordingly, in such an embodiment, the heat generated by the light emitting device 510-2 is discharged to the outside through the first surface 400-2S0 of the sidewall portion 400-2S2.

In an exemplary embodiment, electrical signals are applied to the light emitting device 510-2 through the first and second conductive portions spaced apart from the circuit board 520-2 and the first surface 400-2S0.

According to exemplary embodiments of the display device as described herein, the heat generated by the light emitting device 510-2 may be substantially directly transferred to the support member 400-2 without passing through the circuit substrate 520-2. In such embodiments, a path, through which the heat generated by the light source 500-2 is discharged, is separated from a path, through which the electrical signal is applied, such that the heat generated by the light emitting device may be effectively discharged.

The invention should not be construed as being limited to the exemplary embodiments set forth herein. Rather, the exemplary embodiments described herein are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display device comprising:
  a protective member;
  a display panel disposed in the protective member;
  a light guide member disposed under the display panel, wherein the light guide member comprises a light incident surface;
  a heat discharge member comprising:
    a heat discharge surface and a first flat surface bent from the heat discharge surface, wherein the heat discharge surface disposed opposite to the light incident surface of the light guide member in a first direction in a cross section view, and the heat discharge surface extending in a second direction in the cross section view different from the first direction; and
    the first flat surface which extends in the first direction in the cross section view; and
  a light source which is disposed on the heat discharge member, provides a light to the light incident surface, and
  the light source comprises:
    a light emitting device disposed on the heat discharge surface, wherein the light emitting device comprises a light emitting surface disposed opposite to the light incident surface;
    a circuit board disposed on the first flat surface of the heat discharge member and electrically connected to the light emitting device; and
    a heat discharge portion which is disposed on the heat discharge member, couples the light emitting device to the heat discharge surface of the heat discharge member, and discharges a heat generated from the light emitting device.

2. The display device of claim 1, wherein the light guide member further comprises:
  a first surface, from which the light incident to the light guide member through the light incident surface exits to the display panel;
  a second surface disposed opposite to the first surface; and
  a plurality of connection surfaces which connects the first surface and the second surface, wherein the light incident surface is defined by one of the connection surfaces.

3. The display device of claim 2, wherein the light incident surface is disposed at a corner of the light guide member.

4. The display device of claim 1, wherein
  the light source further comprises first and second conductive portions which electrically connect the circuit board to the light emitting device, and
  the first and second conductive portions are insulated from the heat discharge portion.

5. The display device of claim 4, wherein the heat discharge portion is spaced apart from the first and second conductive portions.

6. The display device of claim 1, wherein the light emitting device further comprises:
a light emitting diode which defines the light emitting surface; and
a body portion comprising:
a first surface on which the light emitting diode is disposed; and
a second surface attached to the heat discharge surface of the heat discharge member.

7. The display device of claim 6, wherein
the heat discharge portion is disposed through and within the body portion, and
the light emitting diode is disposed directly on the heat discharge portion.

8. The display device of claim 1, wherein
the light emitting device further comprises a plurality of light emitting diodes disposed to be spaced apart from each other, and
the light emitting diodes are disposed on the heat discharge portion.

9. The display device of claim 8, wherein
the heat discharge portion comprises a plurality of sub-heat discharge portions insulated from each other and corresponding to the light emitting diodes, respectively, and
each of the sub-heat discharge portions comprises:
a first surface on which a corresponding light emitting diode of the light emitting diodes is disposed; and
a second surface coupled to the heat discharge surface of the heat discharge member.

10. The display device of claim 1, wherein the heat discharge member further comprises a second flat surface which extends in the second direction from the heat discharge surface and is disposed opposite to the first flat surface.

11. The display device of claim 10, wherein the circuit board is in contact with the first flat surface.

12. The display device of claim 10, wherein the circuit board is in contact with the second flat surface.

13. The display device of claim 12, wherein the circuit board comprises a reflective layer disposed on a surface thereof which is disposed opposite to the light guide member.

14. A display device comprising:
a protective member;
a display panel disposed in the protective member;
a light guide member disposed under the display panel, wherein the light guide member comprises: a first surface, a second surface, and a light incident surface which connected the first and second surfaces;
a heat discharge member comprising:
a side surface portion comprising a heat discharge surface disposed opposite to the light incident surface and the heat discharge surface which extends in a first direction; and
a first extension portion which extends in second direction different from the first direction, and the first extension portion which extends from the side surface portion and is disposed opposite to a lower surface of the light guide member; and
a light source comprising:
a light emitting device coupled to the side surface portion of the heat discharge member; and
a circuit board disposed on the first extension portion of the heat discharge member and electrically connected to the light emitting device,
wherein the light emitting device comprises:
a light emitting diode;
a first conductive portion insulated from the side surface portion of the heat discharge member and electrically connected to the light emitting diode;
a second conductive portion insulated from the side surface portion of the heat discharge member and electrically connected to the light emitting diode; and
a heat discharge portion insulated from the first and second conductive portions, the heat discharge portion comprising:
a first surface on which the light emitting diode is disposed, and a second surface coupled to the side surface portion of the heat discharge member.

15. The display device of claim 14, wherein the second surface of the heat discharge portion is in direct contact with the heat discharge surface.

16. The display device of claim 14, wherein the heat discharge portion is spaced apart from the first and second conductive portions.

17. The display device of claim 14, wherein
the heat discharge member further comprises a second extension portion which extends in the second direction from the side surface portion and is disposed opposite to the first extension portion, and
the light guide member is disposed between the first extension portion and the second extension portion.

18. The display device of claim 17, wherein
the first extension portion is disposed on the first surface of the light guide member, and
the circuit board is disposed between the first extension portion and the light guide member.

19. The display device of claim 17, wherein
the first extension portion is disposed on the second surface the light guide member, and
the circuit board is disposed between the first extension portion and the light guide member.

20. A display device comprising:
a protective member;
a display panel disposed in the protective member;
a light guide member disposed under the display panel, wherein the light guide member comprises a light incident surface;
a heat discharge member comprising:
a side surface portion including a heat discharge surface disposed opposite to the light incident surface, and the heat discharge surface which extends in a first direction;
a first extension portion bent from the side surface portion, the first extension portion which extends in a second direction different from the first direction, and the first extension portion which extends from the side surface portion to a lower side of the light guide member; and
a second extension portion bent from the side surface portion, the second extension portion which extends in the second direction from the side surface portion to an upper side of the light guide member; and
a light source comprising:
a light emitting device coupled to the side surface portion; and
a circuit board disposed on the first extension portion of the heat discharge member and electrically connected to the light emitting device,
wherein the light emitting device comprises:
a first light emitting diode;
a second light emitting diode;

a third light emitting diode disposed between the first light emitting diode and the second light emitting diode;

a first conductive portion insulated from the side surface portion and electrically connected to the first light emitting diode;

a second conductive portion insulated from the side surface portion and electrically connected to the second light emitting diode;

a first heat discharge portion comprising: a first surface on which the first light emitting diode is disposed; and a second surface coupled to the side surface portion;

a second heat discharge portion comprising: a first surface on which the second light emitting diode is disposed; and a second surface coupled to the side surface portion; and a third heat discharge portion comprising: a first surface on which the third light emitting diode is disposed; and a second surface coupled to the side surface portion, wherein the first, second and third heat discharge portions are insulated from each other and insulated from the first and second conductive portions.

* * * * *